(12) United States Patent
Sherlin

(10) Patent No.: US 11,192,497 B1
(45) Date of Patent: Dec. 7, 2021

(54) VEHICLE WARNING SYSTEM

(71) Applicant: Sherlin Enterprises LLC, Candler, NC (US)

(72) Inventor: Charles Burnette Sherlin, Candler, NC (US)

(73) Assignee: Sherlin Enterprises LLC, Candler, NC (US)

( * ) Notice: Subject to any disclaimer, the term of this patent is extended or adjusted under 35 U.S.C. 154(b) by 0 days.

(21) Appl. No.: 16/944,852

(22) Filed: Jul. 31, 2020

(51) Int. Cl.
*B60Q 5/00* (2006.01)
*B60W 40/105* (2012.01)
*H04L 12/40* (2006.01)

(52) U.S. Cl.
CPC .......... *B60Q 5/005* (2013.01); *B60W 40/105* (2013.01); *B60W 2510/182* (2013.01); *H04L 12/40* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 3,538,496 A | 11/1970 | Bumpous | |
| 3,559,164 A | 1/1971 | Bancroft et al. | |
| 3,665,391 A | 5/1972 | Bumpous | |
| 4,970,493 A | 11/1990 | Yim | |
| 5,131,612 A * | 7/1992 | Skantar | B61L 3/002 246/107 |
| 5,309,141 A | 5/1994 | Mason et al. | |
| 5,481,243 A | 1/1996 | Lurie et al. | |
| 5,504,472 A | 4/1996 | Wilson | |
| 5,594,416 A | 1/1997 | Gerhaher | |
| 5,942,979 A | 8/1999 | Luppino | |
| 6,020,814 A | 2/2000 | Robert | |
| 6,191,686 B1 * | 2/2001 | Gabriel | B60Q 5/006 340/435 |
| 6,229,438 B1 | 5/2001 | Kutlucinar et al. | |
| 6,271,746 B1 | 8/2001 | Lisiak et al. | |
| 6,424,256 B1 | 7/2002 | Ryder | |
| 6,553,130 B1 | 4/2003 | Lemelson et al. | |
| 6,819,234 B1 | 11/2004 | Bunker et al. | |
| 2012/0126997 A1 * | 5/2012 | Bensoussan | B60Q 5/006 340/905 |
| 2013/0060442 A1 * | 3/2013 | Kaster | B60T 8/885 701/82 |
| 2018/0222459 A1 * | 8/2018 | Kelly | B60W 30/18109 |
| 2020/0082721 A1 * | 3/2020 | Chen | G08G 1/0112 |

* cited by examiner

*Primary Examiner* — Carlos Garcia
(74) *Attorney, Agent, or Firm* — William G. Heedy; The Van Winkle Law Firm

(57) ABSTRACT

A vehicle warning system is for use with a vehicle having an air horn (30) and a vehicle speed sensor (19) which provides a vehicle speed signal to a vehicle data bus (20). The vehicle warning system has at least one brake pressure sensor (22) to provide a brake pressure signal, an air valve (26), and a controller (24). The controller determines that the brake pressure signal indicates an excessive brake pressure and that the vehicle speed signal indicates an excessive vehicle speed, and opens the air valve to activate the air horn. The controller may read the vehicle speed from the vehicle data bus at periodic intervals or when it determines that there is an excessive brake pressure. The brake pressure is considered to be excessive if it exceeds a brake pressure threshold. The vehicle speed is considered to be excessive if it exceeds a vehicle speed threshold.

17 Claims, 2 Drawing Sheets

VEHICLE WARNING SYSTEM

BACKGROUND

It is difficult or impossible for the driver of a tractor-trailer combination to simultaneously steer, shift gears, apply the brakes, and sound an air horn during an emergency braking situation.

SUMMARY

An air horn is automatically sounded during an emergency braking situation.

A vehicle warning system for use with a vehicle having an air horn and a vehicle speed sensor which provides a vehicle speed signal. The vehicle warning system has a brake pressure sensor to provide a brake pressure signal, an air valve, and a controller to determine that the brake pressure signal indicates an excessive brake pressure, to determine that the vehicle speed signal indicates an excessive vehicle speed, and to sound an alarm by activating the air valve. The air valve is connected to the air horn.

A vehicle warning system for use with a vehicle having an air compressor, an air horn, and a vehicle speed sensor which provides a vehicle speed signal to a data bus, the data bus is an On-Board Diagnostics (OBD, OBD II) bus or a Controller Area Network (CAN) bus. The vehicle warning system has a brake pressure sensor to provide a brake pressure signal, an air valve connected between the air compressor and the air horn, and a controller connected to the brake pressure sensor, to the data bus, and to the air valve. The controller determines that the brake pressure signal is above a brake pressure threshold, reads the vehicle speed from the data bus, determines that the vehicle speed signal is above a vehicle speed threshold, and activates the air valve to sound the air horn. The brake pressure threshold and the vehicle speed threshold are preferably predetermined values.

A method for sounding an alarm on a vehicle where the vehicle has an air horn. The method includes obtaining a brake pressure signal, determining that the brake pressure signal indicates an excessive brake pressure, obtaining a vehicle speed signal, determining that the vehicle speed signal indicates an excessive vehicle speed, and activating the air horn.

DETAILED DESCRIPTION

Figure 1:
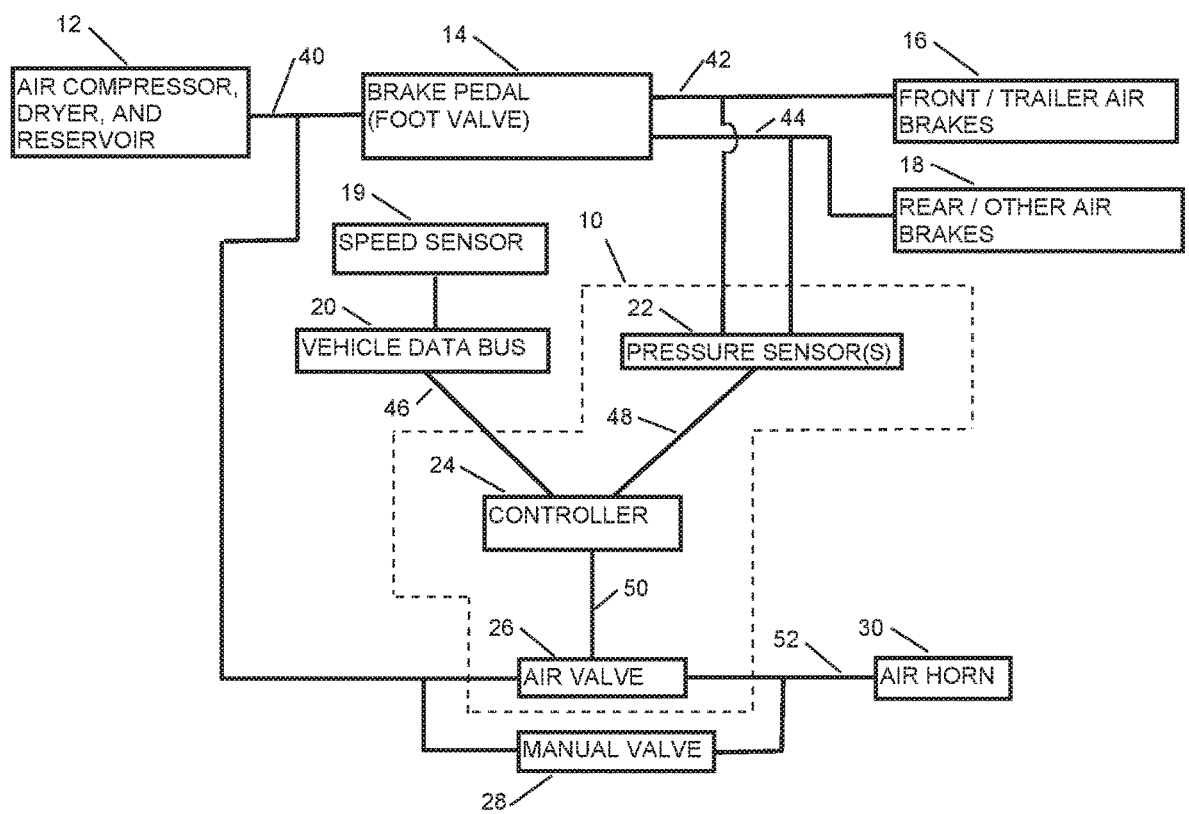
FIG. 1 is an illustration of a vehicle alarm system.

FIG. 1 is an illustration of a vehicle alarm system 10. The term "vehicle", as used in herein, includes, but is not limited to, a tractor, which may or may not be towing one or more trailers. A vehicle includes an air compressor, dryer, and reservoir 12, a brake pedal (foot valve) 14, front/trailer air brakes 16, rear/other air brakes 18, a vehicle speed sensor 19, a vehicle data bus 20, such as but not limited to an OBD, OBD II, or CAN bus, a manual valve 28, an air horn 30, and air lines 40, 42, 44, 52. The vehicle speed sensor 19 provides the vehicle speed to the vehicle data bus 20. The vehicle alarm system 10 includes at least one pressure sensor 22, a controller 24, an air valve 26, an electrical or optical connection 46 to the vehicle data bus 20, an electrical or optical signal input line 48, and an electrical or optical signal output line 50.

The pressure sensor(s) 22 is connected to at least one of the air lines 42, 44, and its output is connected via signal input line 48 to an input of the controller 24. The signal output line 50 from the controller 24 is connected to the air valve 26, which is connected in parallel with the manual valve 28.

Consider first a normal operational scenario of a typical vehicle. When the driver (not shown, but whom we will call "Roy" for convenience) wishes to slow the vehicle down, or to prevent the vehicle from accelerating on a downhill slope, Roy will press on the brake pedal 14. This allows pressurized air from the air compressor, dryer, and reservoir 12 to be applied to the brakes 16, 18, which slows down the vehicle. Roy may also shift gears instead of, or in addition to, applying the brakes.

If Roy wishes to sound the air horn 30, he will pull a cord (not shown) connected to the manual valve 28. This allows pressurized air from the air compressor, dryer, and reservoir 12 to be applied to the air horn 30, thus sounding the air horn as an alarm.

Consider now a possible emergency scenario. The vehicle is traveling down a highway at 60-70 miles per hour (mph) and is rapidly approaching an intersection with another street, e.g., Krebs Street. Roy notices a car on Krebs Street and also notices that the car is rapidly approaching the intersection, and does not appear to be slowing down to stop at the intersection. Perhaps the person in that car is talking on the cell phone, adjusting the radio, setting the GPS, distracted by a noisy child in the car, just daydreaming, or falling asleep. If both the vehicle and the car continue at their present speeds they will likely enter the intersection at the same time, with disastrous consequences.

One action that Roy can take is to pull the cord, thereby sounding the air horn, and hopefully getting the attention of the person in the car who can then stop the car short of the intersection. Another action that Roy can take is to apply the brakes of the vehicle in an attempt to slow the vehicle enough that the car can get through the intersection before the vehicle arrives at the intersection. Depending upon the vehicle speed and the distance to the intersection, this may require Roy to apply full braking while trying to keep the tractor-trailer combination from skidding out of control or jack-knifing, and while trying to see if an adjacent lane is clear so that Roy can attempt to move the vehicle into that adjacent lane.

Unfortunately, there is often not enough time for Roy to take both actions sequentially and, as Roy's hands are fully occupied with steering and shifting, and Roy does not have an extra, third hand to pull the cord to sound the air horn, Roy cannot take both actions simultaneously.

The vehicle alarm system 10 effectively and automatically provides that extra, third hand to sound the air horn. One or more pressure sensors 22 are connected to the brake air lines 42, 44, measure the braking pressure, and provide a brake pressure signal over the signal line 48 to a controller 24. In one implementation, the brake pressure signal is an analog or digital signal corresponding to the actual brake pressure, and the controller 24 determines that the brake pressure is excessive. In another implementation, the pressure sensor 22 determines that the brake pressure is excessive and sends a digital brake pressure signal indicating that the brake pressure is excessive to the controller 24. The brake pressure is considered to be excessive if it exceeds a brake pressure threshold. The brake pressure threshold is preferably about 60 pounds per square inch (psi). The brake pressure threshold may, however, be another value, such as to compensate for the characteristics of a particular driver, vehicle, load, or terrain.

If, however, the speed of the vehicle is only 5 mph, rather than 70 mph, or the vehicle is stopped, then there is probably no need to sound the air horn, regardless of the brake pressure.

Therefore, the controller 24 preferably also obtains the speed of the vehicle from the vehicle data bus 20, and compares the speed of the vehicle to a vehicle speed threshold. If the speed of the vehicle is greater than the vehicle speed threshold then the speed of the vehicle is considered to be excessive. The vehicle speed threshold may be, for example, 50 mph, but may be another value, higher or lower, such as to compensate for the characteristics of a particular driver, vehicle, load, or terrain.

If both the brake pressure and the vehicle speed are excessive then an alarm (air horn 30) is sounded. Then, after the brake pressure is reduced below the brake pressure threshold and/or the speed of the vehicle is reduced below the vehicle speed threshold, then the emergency situation has apparently passed and the controller will stop sounding the air horn 30.

The vehicle alarm system 10 also provides another benefit. Some drivers, when approaching a red light, hope that the light will soon change so that they can avoid gear-shifting as much as possible, and so such drivers will often wait until the last minute before hitting the brakes. This is generally considered to be an undesirable method of driving. If the driver acts in such a manner, then hitting the brakes, especially if the excessive speed value is low enough, will result the air horn being activated, thereby drawing undesired attention to the vehicle and driver. This undesired attention can serve to retrain the driver to better driving methods.

In one embodiment, the pressure sensor 22 outputs a digital signal indicating that the brake pressure is excessive. In this embodiment, the brake pressure sensor(s) 22 is a type QPSH-AP-42 digital pressure switch, manufactured by Automation Direct, Cumming, Ga. This device allows the user to program the brake pressure threshold directly into the pressure sensor 22. The device then provides an output which indicates whether the brake pressure is higher or lower than the brake pressure threshold. Other types of pressure switches, and/or pressure switches made by other manufacturers, may also be used.

In another embodiment, the pressure sensor 22 outputs a brake pressure signal which indicates or corresponds to the actual applied brake pressure. The controller 24 compares the brake pressure signal to a brake pressure threshold to determine whether the brake pressure is excessive. In this embodiment the brake pressure threshold is programmed into the controller 24. The brake pressure sensor(s) 22 may again be a type QPSH-AP-42 digital pressure switch, as that device also provides an analog output signal corresponding to the actual brake pressure. An analog-to-digital converter (not shown) may be used to convert that analog signal to a digital signal, and then that digital signal is provided to the controller 24. If the output of the pressure sensor 22 is a digital signal corresponding to the actual applied brake pressure then this signal may be directly used by the controller 24 without the need for an intermediate analog-to-digital converter. The controller 24 is preferably a microprocessor having an internal and/or external memory large enough to accommodate the operating instructions and data to implement the vehicle alarm system 10, along with standard accessory components such as a power supply, input/output devices and interfaces, etc. The controller 24 may also, if desired, be constructed of digital and/or analog components, such as gates, amplifiers, comparators, drivers, etc.

For example, in another embodiment, if the pressure sensor 22 outputs an analog output then that output may be provided to an analog comparator, which has a variable threshold setting corresponding to the brake pressure threshold, and the comparator output is provided to the controller 24 or to a logic gate.

In one embodiment the vehicle data bus 20 is an OnBoard Diagnostics (OBD, OBD II) data bus. This data bus 20 periodically updates the vehicle speed as provided by the vehicle speed sensor 19, nominally every second, and the controller 24 reads the vehicle speed when it is updated. At 60 mph, however, the vehicle will travel 88 feet between updates. Thus, if the vehicle is just below the vehicle speed threshold when the brake pressure becomes excessive, then the vehicle may travel a substantial distance before the vehicle speed is updated to reflect the higher, excessive vehicle speed and the alarm is sounded.

In another embodiment, the vehicle data bus 20 is a Controller Area Network (CAN) bus. In this embodiment the controller 24 will access this data bus 20 and request the vehicle speed from the vehicle speed sensor 19 whenever the brake pressure is excessive. This allows the controller 24 to immediately obtain the current vehicle speed and to act more quickly, thereby reducing or eliminating the substantial travel distance mentioned above.

In one embodiment there is a single pressure sensor 22, and it may be connected to either the air line 42 for the front/trailer brakes 16, or to the air line 44 for the rear/other brakes 18. In another embodiment there are at least two pressure sensors 22, one for the air line 42 and the other for the air line 44. If at least one pressure sensor 22 indicates an excessive pressure and the speed is excessive then the alarm will be sounded. The use of two or more pressure sensors 22 provides for redundancy in the event that one of the air lines 42, 44 fails.

In some tractors there may be an unused fitting on the air line 42, 44, and the pressure sensor(s) 22 can be attached to that fitting. If there is no spare fitting available then the air line 42, 44 may be cut and a "T"-coupling installed, and the pressure sensor 22 can be attached to the "T"-coupling. Also, with respect to the air lines 40 and 52, it may be necessary to cut these lines and install "T"-couplings so that the air valve 26 can be connected in parallel with the manual valve 28.

Figure 2:
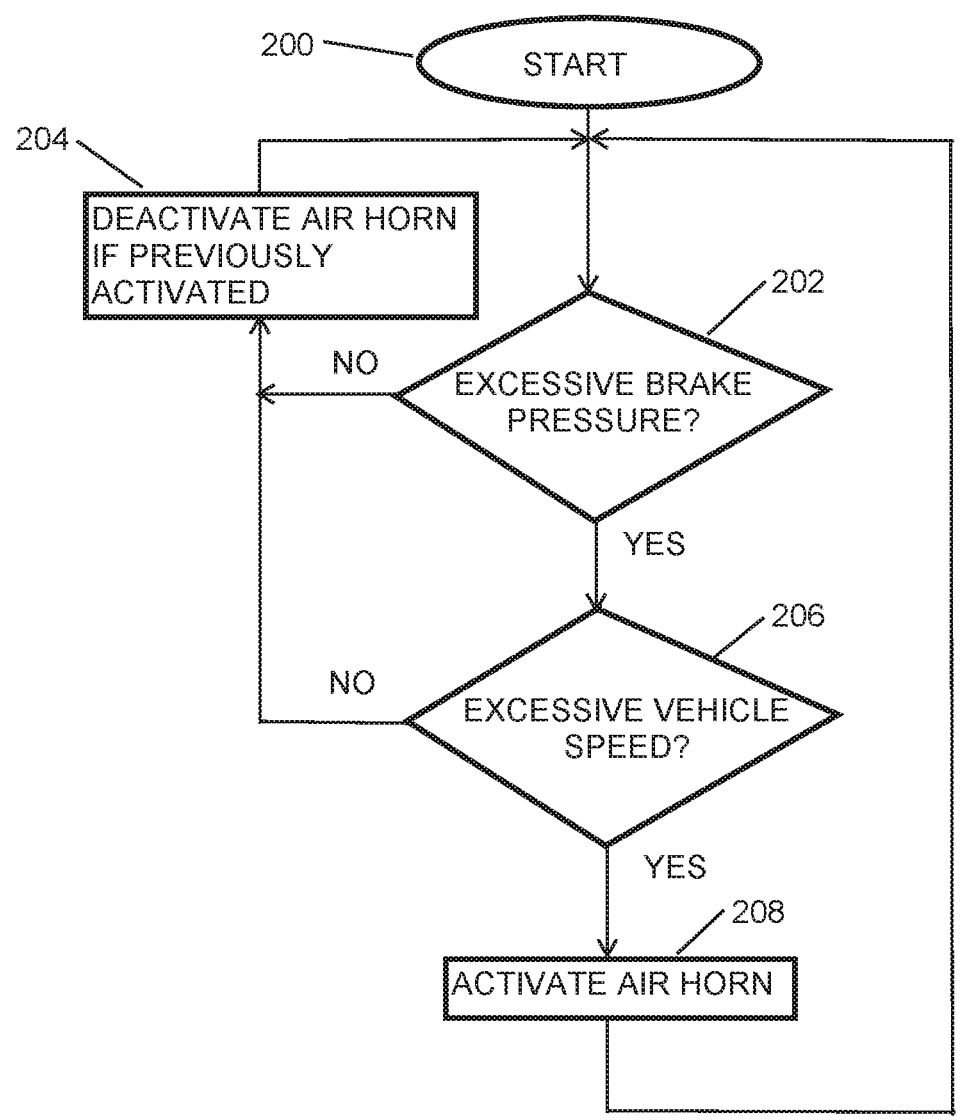
FIG. 2 is a flowchart of the process of the vehicle alarm system.

FIG. 2 is a flowchart of the process of the vehicle alarm system. Upon starting 200, and after any initialization procedures, a determination 202 is made whether there is excessive brake pressure. If not, then step 204 deactivates the air horn, if previously activated, and the system returns to determination 202.

If there is excessive brake pressure then a determination 206 is made whether there is excessive vehicle speed. If not, then step 204 deactivates the air horn, if previously activated, and the system returns to determination 202.

If there is excessive vehicle speed then the air horn is activated 208, and then the system returns to determination 202 wherein the air horn continues to be activated if the vehicle speed and brake pressure continue to be excessive, or the air horn is deactivated if one or both of the vehicle speed and brake pressure is no longer excessive.

In one implementation, determination 202 is executed before determination 206. In another implementation, determination 206 is executed before determination 202.

In one implementation, determination 202 is executed by the pressure sensor 22. In another implementation, determination 202 is executed by the controller 24.

In one implementation, the controller 24 periodically obtains the vehicle speed information from the data bus 20. In another implementation, the controller 24 obtains the vehicle speed information from the data bus 20 once determination 202 indicates that there is excessive brake pressure.

In another implementation, the controller 24 may start one or more internal or external timers when the air horn is activated, and then deactivates the air horn when a timer expires. This may be used to limit the horn time—if a 60 second warning blast doesn't get attention then a longer warning blast probably won't either. This may also be used to rapidly turn the horn on and off so as to get attention and impart a greater sense of urgency.

Hysteresis may be used in conjunction with the brake pressure threshold. For example, if the excessive brake pressure threshold is 60 psi then, once that threshold has been met, the brake pressure may still be considered to be excessive until it drops to a lower value, such as 50 psi. This prevents the air horn from being deactivated by a minor fluctuation in air pressure during emergency braking.

Hysteresis may be used in conjunction with the vehicle speed threshold. For example, if the excessive vehicle speed threshold is 60 mph then, once that threshold has been met, the vehicle speed may still be considered to be excessive until it drops to a lower value, such as 45 mph. This prevents the air horn from being immediately deactivated during emergency braking if the vehicle speed at the time of the emergency was just at the vehicle speed threshold.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

It will be further understood that the terms "includes," "comprises," "including," and/or "comprising" specify the presence of stated features, steps, operations, elements, and/or components, but do not preclude the presence or addition of one or more other features, steps, operations, elements, components, and/or groups thereof unless explicitly stated otherwise or the context clearly requires otherwise. The terms "includes," "has" or "having" or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items. As used herein, phrases such as "between X and Y" and "between about X and Y" should be interpreted to include X and Y unless expressly stated otherwise or the context clearly indicates otherwise.

Terms such as "about", "approximately", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While the terms vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

The subject matter described herein is provided by way of illustration only and should not be construed as limiting the nature and scope of the subject invention. While examples of aspects of the subject invention have been provided above, it is not possible to describe every conceivable combination of components or methodologies for implementing the subject invention, and one of ordinary skill in the art may recognize that further combinations and permutations of the subject invention are possible. Furthermore, the subject invention is not necessarily limited to implementations that solve any or all disadvantages which may have been noted in any part of this disclosure. Various modifications and changes may be made to the subject invention described herein without following, or departing from the spirit and scope of, the exemplary embodiments and applications illustrated and described herein. Although the subject matter presented herein has been described in language specific to components used therein, it is to be understood that the subject invention is not necessarily limited to the specific components or characteristics thereof described herein; rather, the specific components and characteristics thereof are disclosed as example forms of implementing the subject invention. Accordingly, the disclosed subject matter is intended to embrace all alterations, modifications, and variations, that fall within the scope and spirit of any claims that are written, or may be written, for the subject invention.

The foregoing detailed description of some embodiments of the invention is intended only to convey to a person having ordinary skill in the art the fundamental aspects of the invention and is not intended to limit, and should not be construed as limiting, the scope of the invention.

The invention claimed is:

1. A vehicle warning system for use with a vehicle having a vehicle speed sensor, the vehicle speed sensor providing a vehicle speed signal, the vehicle warning system comprising:
    a brake pressure sensor to provide a brake pressure signal;
    an air valve responsive to a control signal;
    a controller connected to the brake pressure sensor, the vehicle speed sensor, and the air valve;
    wherein the controller is configured to receive the brake pressure signal and the vehicle speed signal;
    the controller configured to initiate the control signal when the brake pressure signal is above a brake pressure threshold and the vehicle speed signal is above a vehicle speed threshold; and
    the controller configured to terminate the control signal when the brake pressure signal is below the brake pressure threshold or the vehicle speed signal is below the vehicle speed threshold.

2. The vehicle warning system of claim 1 wherein the vehicle also has a data bus, the data bus being either an On-Board Diagnostics (OBD, OBD II) bus or a Controller Area Network (CAN) bus, the vehicle speed sensor provides the vehicle speed signal to the data bus, and the controller reads the vehicle speed signal from the data bus.

3. The vehicle warning system of claim 2 wherein the controller periodically reads the vehicle speed signal from the data bus.

4. The vehicle warning system of claim 2 wherein the controller reads the vehicle speed signal from the data bus when the brake pressure signal indicates an excessive brake pressure.

5. The vehicle warning system of claim 1 wherein the controller compares the brake pressure signal to the brake pressure threshold to determine that the brake pressure signal indicates an excessive brake pressure.

6. The vehicle warning system of claim 5 wherein the brake pressure threshold is programmable.

7. The vehicle warning system of claim 1 wherein the vehicle also has an air compressor and an air horn, and the air valve is connected between the air compressor and the air horn.

8. The vehicle warning system of claim 7 wherein the vehicle also has an air horn pull valve, and the air valve is connected in parallel with the air horn pull valve.

9. The vehicle warning system of claim 1 wherein the vehicle also has a data bus, the data bus being either an On-Board Diagnostics (OBD) bus or a Controller Area Network (CAN) bus, the brake pressure sensor provides the brake pressure signal to the data bus, and the controller reads the brake pressure signal from the data bus.

10. The vehicle warning system of claim 1 wherein the vehicle speed threshold is programmable.

11. The vehicle warning system of claim 1 wherein the controller is a microprocessor.

12. A method for sounding an alarm on a vehicle, the vehicle having an air horn, the method comprising:
    obtaining a brake pressure signal;
    determining that the brake pressure signal exceeds a brake pressure threshold;
    obtaining a vehicle speed signal;
    determining that the vehicle speed signal exceeds a vehicle speed threshold;
    activating the air horn in response to determining both the brake pressure threshold and the vehicle speed threshold are exceeded; and
    deactivating the air horn when at least one of: the brake pressure signal drops below the brake pressure threshold, or the vehicle speed signal drops below the vehicle speed threshold.

13. A vehicle warning system for use with a vehicle having an air compressor, an air horn, and a vehicle speed sensor, the vehicle speed sensor providing a vehicle speed signal to a data bus, the data bus being an On-Board Diagnostics (OBD, OBD II) bus or a Controller Area Network (CAN) bus, the vehicle warning system comprising:
    a brake pressure sensor to provide a brake pressure signal;
    an air valve connected between the air compressor and the air horn and responsive to a control signal;
    a controller connected to the brake pressure sensor, to the data bus, and to the air valve;
    wherein the controller is configured to receive the brake pressure signal and the vehicle speed signal;
    the controller configured to initiate the control signal when the brake pressure signal is above a first brake pressure threshold and the vehicle speed signal is above a first vehicle speed threshold;
    the controller configured to terminate the control signal when the brake pressure signal is below a second brake pressure threshold or the vehicle speed signal is below a second vehicle speed threshold; and
    wherein the second brake pressure threshold has a value lower than the first brake pressure threshold and the second vehicle speed threshold has a value lower than the first vehicle speed threshold.

14. The vehicle warning system of claim 13 wherein the vehicle also has an air horn pull switch, and the air valve is connected in parallel with the air horn pull switch.

15. The vehicle warning system of claim 13 wherein the controller is a microprocessor.

16. The vehicle warning system of claim 13 wherein the controller periodically reads the vehicle speed signal from the data bus.

17. The vehicle warning system of claim 13 wherein the controller reads the vehicle speed signal from the data bus when the brake pressure signal indicates an excessive brake pressure.

* * * * *